(12) United States Patent
Russell et al.

(10) Patent No.: US 8,349,036 B2
(45) Date of Patent: Jan. 8, 2013

(54) SYSTEMS AND METHOD FOR HEATING AND DRYING SOLID FEEDSTOCK IN A GASIFICATION SYSTEM

(75) Inventors: Steven Craig Russell, Houston, TX (US); Judeth Brannon Corry, Manvel, TX (US)

(73) Assignee: General Electric Company, Schenectady, NY (US)

( * ) Notice: Subject to any disclaimer, the term of this patent is extended or adjusted under 35 U.S.C. 154(b) by 458 days.

(21) Appl. No.: 12/652,835

(22) Filed: Jan. 6, 2010

(65) Prior Publication Data

US 2011/0162277 A1 Jul. 7, 2011

(51) Int. Cl.
| | |
|---|---|
| *B01J 7/00* | (2006.01) |
| *C10B 1/00* | (2006.01) |
| *C10G 3/00* | (2006.01) |
| *C01B 6/24* | (2006.01) |

(52) U.S. Cl. .................. 48/61; 48/89; 48/108; 423/644
(58) Field of Classification Search ............... 48/61, 89, 48/108; 423/644
See application file for complete search history.

(56) References Cited

U.S. PATENT DOCUMENTS

| | | | | |
|---|---|---|---|---|
| 4,074,981 A | * | 2/1978 | Slater | .......................... 48/197 R |
| 4,209,304 A | | 6/1980 | Kessler et al. | |
| 4,465,496 A | * | 8/1984 | Suggitt | ....................... 48/197 R |
| 4,704,137 A | * | 11/1987 | Richter | ....................... 48/197 R |
| 4,976,101 A | | 12/1990 | Schiffers | |
| 4,993,332 A | * | 2/1991 | Boross et al. | .................. 110/347 |
| 5,415,673 A | * | 5/1995 | Hilton et al. | ................ 48/197 R |
| 5,953,899 A | | 9/1999 | Rao et al. | |
| 2006/0075682 A1 | | 4/2006 | Bullinger et al. | |

FOREIGN PATENT DOCUMENTS

| | | |
|---|---|---|
| EP | 0092856 A2 | 11/1983 |
| JP | 63139987 A | 6/1988 |
| WO | 2009/147153 A1 | 12/2009 |

OTHER PUBLICATIONS

PCT Search Report issued in connection with corresponding WO Patent Application No. US2011/020354 filed on Jan. 6, 2011.

* cited by examiner

*Primary Examiner* — Matthew Merkling
(74) *Attorney, Agent, or Firm* — Armstrong Teasdale LLP (57) ABSTRACT

A system for heating and drying a quantity of coal feedstock being channeled to a gasifier includes a first heat exchanger coupled in flow communication with the gasifier for transferring heat from an input stream to an output stream of heat transfer fluid, and a second heat exchanger positioned downstream from the first heat exchanger for receiving the output stream of heat transfer fluid from the first heat exchanger, said second heat exchanger transfers heat from the output stream of heat transfer fluid to a stream of heating gas.

12 Claims, 8 Drawing Sheets

SYSTEMS AND METHOD FOR HEATING AND DRYING SOLID FEEDSTOCK IN A GASIFICATION SYSTEM

BACKGROUND OF THE INVENTION

The field of the present invention relates generally to gasification systems and, more particularly, to systems and methods for removing moisture from solid feedstock within a gasification system.

The gasification of solid feedstocks and the subsequent combustion of hydrocarbon components from the feedstock in a gas turbine engine are known. When coal is used as the feedstock, some known gasification processes require a relatively dry (i.e., low moisture content) coal be used because of known difficulties associated with conveying moist solids, and the inherent efficiency losses associated with moisture that may be present in the coal feedstock. Since almost all commercially available coals contain a certain amount of water, a need exists to dry the coal in an efficient manner prior to gasification. This need becomes even more apparent when using sub-bituminous, lignite, or brown coal feedstocks that often contain between about 20% to about 65% by weight water.

Some known methods for drying solid feedstocks in gasifiers involve sweeping very hot gas through a solids grinding mill. In such systems, in order to efficiently evaporate the excess moisture, the drying gas must be maintained at a temperature well above the boiling temperature of water at the system operating pressure, normally between 300° F. and 900°. Various systems have been used in the past to create a drying gas medium that can be used to remove excess water in solids coal feedstocks. However, generally known sources of heating and drying solid feedstock have drawbacks that invariably reduce overall plant efficiency. For example, many known systems may use superheated steam and/or gas turbine extraction air channeled to the heat exchangers for drying, or may use a fuel, such as natural gas or propane, within a direct fired or an indirect fired heat exchangers. In such known direct fired configurations, hot combustion gases are generated using mixtures of air and fuel. Direct firing of those fuels creates pollutant emissions and thus is not an environmentally acceptable method to economically dry a solid feedstock. Other known methods use process steam and/or heated gases supplied from a separate power plant in an indirect fired heat exchanger. Again, the need for separate power plant facilities for providing the necessary heat often is not an economical alternative.

Another known method of drying solids involves burning a portion of the clean synthesis gas (also known as "syngas") produced through gasification and pass combustion gases over the milled coal as it is transported into a powder bunker or hopper. Milling and drying plants may reduce the overall efficiency of the power generating plant because such plants consume part of the gaseous fuel during the drying process. Another known method obtains drying energy by burning a portion of the milled coal, thereby heating the feed circulating in the drying plant. However, in each of these known methods, the net efficiency of the power generating plant decreases. Moreover, emissions, such as sulfur, from the power plant increase when making drying energy available in such a manner. While various conventional methods exist for drying coal feedstocks, a significant need exists to reduce the inherent thermal inefficiencies in such known processes.

BRIEF DESCRIPTION OF THE INVENTION

In one aspect, a system for heating and drying a quantity of coal feedstock being channeled to a gasifier is provided. The system includes a first heat exchanger coupled in flow communication with the gasifier for transferring heat from an input stream to an output stream of heat transfer fluid, and a second heat exchanger positioned downstream from the first heat exchanger for receiving the output stream of heat transfer fluid from the first heat exchanger. The second heat exchanger transfers heat from the output stream of heat transfer fluid to a stream of heating gas.

In another aspect, a gasification system that includes a gasifier and a coal feedstock moisture removal system is provided. The moisture removal system includes a first heat exchanger coupled in flow communication with the gasifier for transferring heat from an input stream to an output stream of heat transfer fluid, and a second heat exchanger positioned downstream from the first heat exchanger for receiving the output stream of heat transfer fluid from the first heat exchanger. The second heat exchanger transfers heat from the output stream of heat transfer fluid to a stream of heating gas.

In a further aspect, a method for heating and drying solid feedstock in a gasification system is provided. The method includes coupling a first heat exchanger downstream from a gasifier, wherein the first heat exchanger is configured to transfer heat from an input stream to an output stream of heat transfer fluid, and coupling a second heat exchanger downstream from the first heat exchanger, wherein the second heat exchanger is configured to receive the output stream of heat transfer fluid from the first heat exchanger and transfer heat from the output stream of heat transfer fluid to a stream of heating gas. The method includes channeling the stream of heating gas to a grinding mechanism to facilitate removing moisture from a stream of solid coal feedstock within the grinding mechanism.

Various refinements exist of the features noted in relation to the above-mentioned aspects of the present embodiments. Additional features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION OF THE INVENTION

The following description of various embodiments is merely exemplary in nature and is in no way intended to limit the invention, its application, or uses. Additionally, the advantages provided by the embodiments, as described below, are exemplary in nature and not all embodiments provide the same advantages or the same degree of advantages.

Figure 1:
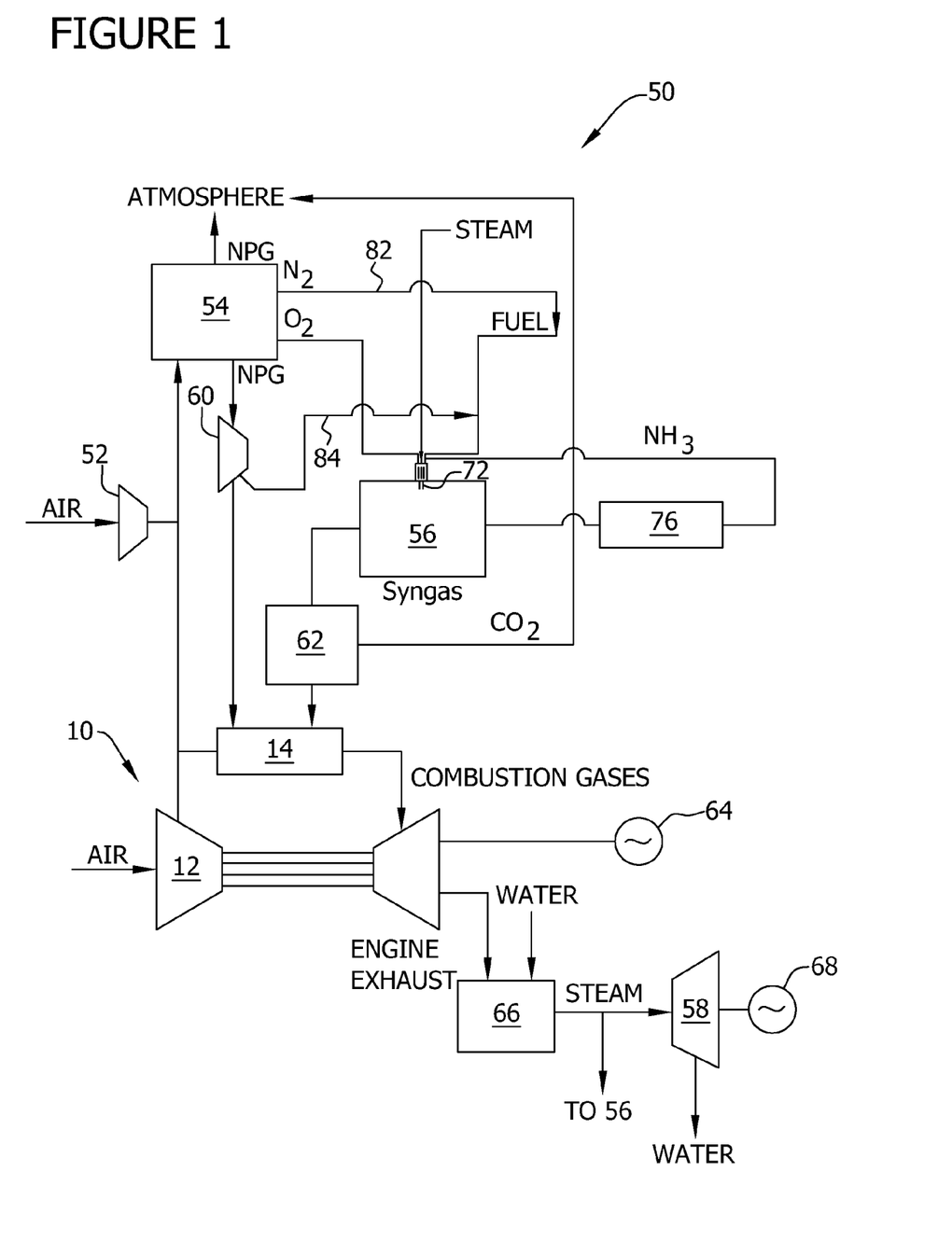
FIG. 1 is a schematic diagram of an exemplary integrated gasification combined-cycle (IGCC) power generation system.

FIG. 1 is a schematic diagram of an exemplary integrated gasification combined-cycle (IGCC) power generation system 50. In the exemplary embodiment, IGCC system 50 generally includes a main air compressor 52, an air separation unit 54 coupled in flow communication to compressor 52, a gasifier 56 coupled in flow communication to air separation unit 54, a gas turbine engine 10 coupled in flow communication to gasifier 56, and a steam turbine 58. In operation, compressor 52 compresses ambient air that is then channeled to air separation unit 54. In some embodiments, in addition to or in the alternative to compressor 52, compressed air from gas turbine engine compressor 12 is supplied to air separation unit 54. Air separation unit 54 uses the compressed air to generate oxygen for use by gasifier 56. More specifically, air separation unit 54 separates the compressed air into separate flows of oxygen and a gas by-product, sometimes referred to as a "process gas". The process gas generated by air separation unit 54 includes nitrogen and is referred to herein as "nitrogen process gas". The nitrogen process gas may also include other gases such as, but not limited to, oxygen and/or argon. For example, in some embodiments, the nitrogen process gas includes between about 95% and about 100% nitrogen.

The oxygen flow from air separation unit 54 is channeled to gasifier 56 for use in generating partially combusted gases, referred to herein as "syngas" for use by gas turbine engine 10 as fuel, as is described in more detail herein. In some embodiments, at least some of the nitrogen process gas flow, a by-product of air separation unit 54, is vented to the atmosphere. Moreover, in other embodiments, some of the nitrogen process gas flow is injected into a combustion zone (not shown) within gas turbine engine combustor 14 to facilitate controlling emissions generated within engine 10, and more specifically to facilitate reducing the combustion temperature and nitrous oxide emissions from engine 10. In the exemplary embodiment, IGCC system 50 also includes a compressor 60 for compressing the nitrogen process gas flow before it is injected into the combustion zone. For an IGCC system, the nitrogen process gas may also be utilized as the make-up gas used for coal grinding, drying, and low pressure pneumatic transport (82). Further, the nitrogen process gas may be used in high pressure pneumatic transport (84) of the ground and dried coal to the gasifier (56).

Gasifier 56 converts a mixture of fuel, the oxygen supplied by air separation unit 54, high pressure carrier gas such as nitrogen process gas or carbon dioxide process gas, and recycle solids, and/or liquid water and/or steam, and/or a slag additive into an output of syngas for use by gas turbine engine 10 as fuel. Although gasifier 56 may use any fuel, in some embodiments, gasifier 56 uses coal, petroleum coke, residual oil, oil emulsions, tar sands, and/or other similar fuels. In the exemplary embodiment, the syngas generated by gasifier 56 includes carbon dioxide. As such, in the exemplary embodiment, the syngas generated by gasifier 56 is cleaned in a clean-up device 62 before being channeled to gas turbine engine combustor 14 for combustion thereof. Carbon dioxide may be separated from the syngas during clean-up and, in the exemplary embodiment, the carbon dioxide is vented to the atmosphere. In the exemplary embodiment, a gasifier blowdown connection is coupled to a waste treatment system (not shown in FIG. 1).

Power output from gas turbine engine 10 is used to drive a generator 64 that supplies electrical power to a power grid (not shown). Exhaust gases from gas turbine engine 10 are supplied to a heat recovery steam generator 66 that generates steam for use by steam turbine 58. Power generated by steam turbine 58 drives an electrical generator 68 that supplies electrical power to a power grid. In the exemplary embodiment, steam from heat recovery steam generator 66 is supplied to gasifier 56 for generating the syngas.

In the exemplary embodiment, IGCC system 50 includes a syngas condensate stripper 76 that receives condensate from a stream of syngas discharged from gasifier 56. The condensate typically includes a quantity of ammonia that is dissolved in the condensate. At least a portion of the dissolved ammonia is formed in gasifier 56 from a combination of nitrogen gas and hydrogen in gasifier 56. To remove the dissolved ammonia from the condensate the condensate is boiled. Stripped ammonia is discharged from stripper 76 and is channeled to a waste treatment system (not shown in FIG. 1). In an alternative embodiment, the stripped ammonia is returned to gasifier 56, at a pressure that is higher than that of the gasifier, to be decomposed in a high temperature region of the gasifier 56 proximate a nozzle tip 72. The ammonia is injected into the gasifier 56 such that the flow of ammonia in the vicinity of the high temperature region proximate nozzle tip 72 facilitates cooling nozzle tip 72.

Figure 2:
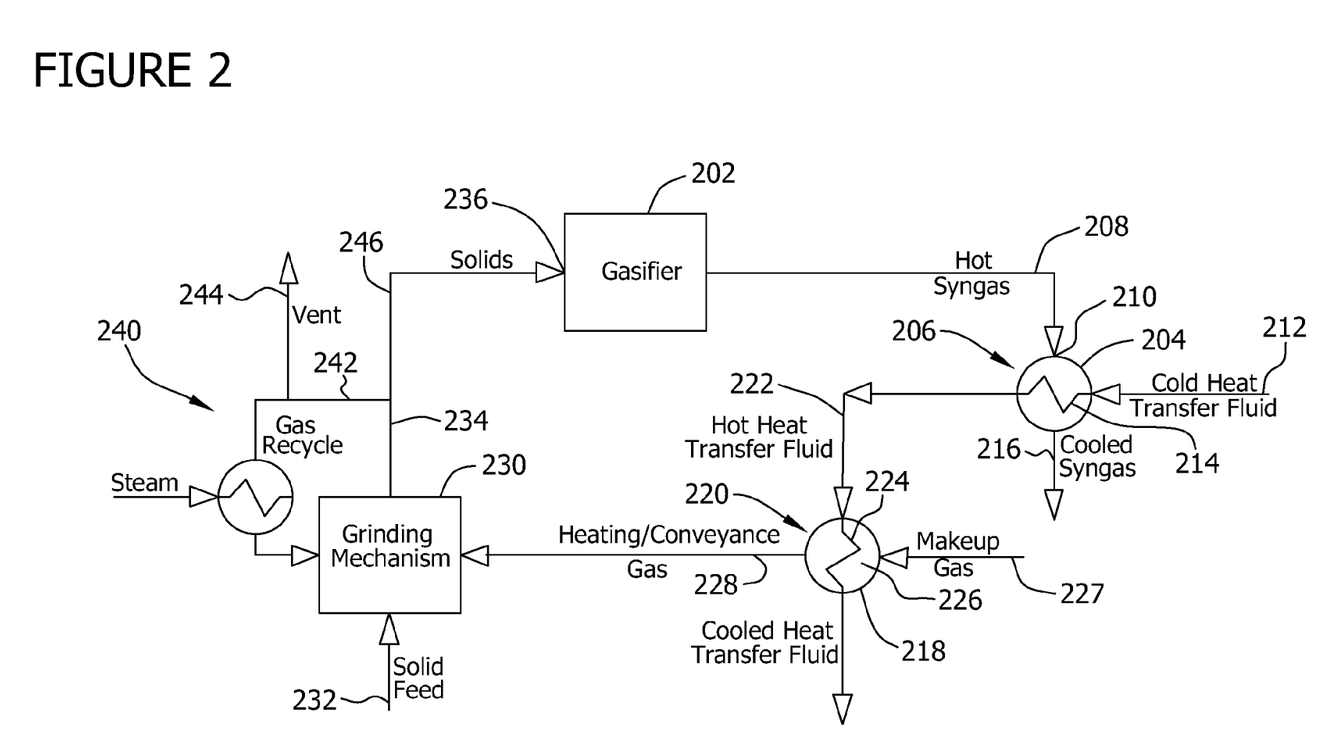
FIG. 2 is a process flow diagram of an exemplary system for use in heating and drying the solid feedstock being channeled to a gasifier in a gasification system.

FIG. 2 is a process flow diagram of an exemplary system 200 for use in heating and drying solid coal feedstock being channeled to a gasifier 202 in gasification system 50 (shown in FIG. 1). Gasifier 202 converts a mixture of fuel, oxygen supplied by air separation unit, recycle solids, liquid water and/or steam, and/or a slag additive, into an output of hot syngas, that is typically about 2400° F. to about 2600° F., and which contains the results of incomplete coal combustion. In the exemplary embodiment, a syngas cooler 204 having a tube and shell configuration 206 is coupled in flow communication with gasifier 202 via a conduit 208. Cooler 204 receives hot syngas at a shell-side input 210, and a heat transfer fluid is channeled via a conduit 212 through a tube side 214 of syngas cooler 204. During heat transfer within cooler 204, a temperature of the heat transfer fluid is increased to a temperature ranging from about 400° F. to about 1000° F., and a temperature of the hot syngas is cooled and subsequently channeled via a conduit 216 to gas turbine engine 10 (shown in FIG. 1) for use as fuel therein.

In an alternative embodiment, a heat transfer fluid could be used in drying solid coal feedstock in a fluidized bed dryer configuration rather than in a tube and shell configuration 206. A fluidized bed dryer, as is known in the art, includes coils that transfer heat to a solids bed that is in direct contact with the coils. In such an embodiment, the residence of the coal inside the bed dryer is about one hour and the heating medium is typically lower than is used with the grinding and drying mill. Moreover, in such an embodiment, the range of the dryer may be about, but is not limited to being, 250° F. to 400° F.

In the exemplary embodiment, the heat transfer fluid could be a "hot oil" Dowtherm®, commercially available from Dow Chemical Company of Midland, Mich. Alternatively, the heat transfer fluid may be any "hot oil" common in the chemical and refining industries such as, for example, Theminol®, commercially available from Monsanto Chemical Inc. of Saint Louis, Mo. In another alternative embodiment, the heat transfer fluid may be water, depending on the heat exchanger design and water pressure within the gasification system 50 (shown in FIG. 1).

In the exemplary embodiment, a heat exchanger 218 having a tube and shell configuration 220 is coupled in flow communication with syngas cooler 204 via a conduit 222. Heat transfer fluid from syngas cooler 204 is channeled via conduit 222 through a tube side 224 of heat exchanger 218, and a quantity of makeup gas formed from a combination of gases, i.e., nitrogen, oxygen and carbon dioxide, is channeled through a shell side 226 of heat exchanger 218 via an inlet conduit 227 to produce a dry, high temperature heating/conveyance gas. More specifically and in the exemplary embodiment, heat is transferred from the high temperature heat transfer fluid to the makeup gas, which is discharged from heat exchanger 218 via a conduit 228 at a temperature ranging from about 300° F. to about 900° F. The makeup gas is channeled via conduit 228 to a grinding mechanism 230, wherein the makeup gas serves as a drying and conveyance medium for solid coal feedstock particulates produced within grinding mechanism 230, as described in more detail herein.

A stream of solid coal feed is channeled to grinding mechanism 230 via a conduit 232, wherein the solid coal feed is ground to a specified coarseness. In the exemplary embodiment, ground particulate feedstock is entrained in the makeup gas within grinding mechanism 230 and is discharged therefrom via an exhaust conduit 234, along with a quantity of water vapor removed from the solids particulate during the heating and drying process. Grinding mechanism 230 is coupled in flow communication with an inlet 236 of gasifier 202 via exhaust conduit 234. During operation, the makeup gas initially is used to facilitate drying the pulverized fuel particulates that contain residual amounts of water, and to provide the principal conveying medium that facilitates channeling the particulate solids through the grinding mechanism 230 to gasifier 202.

In the exemplary embodiment, to facilitate preventing an accumulation of water within system 200 and to control the amount and size of entrained feedstock particulates fed to the gasifier 202, system 200 includes a vent assembly 240. A predetermined amount of the entrained solids/vapor stream within conduit 234 is recycled to grinding mechanism 230 via a recycle stream 242 (two phase) through a cyclone separator (not shown) that separates a majority of the entrained particulate from an output flow of grinding mechanism 230. A portion of the vapor stream that contains water vapor generated during the heating and drying steps is vented to the atmosphere via an exhaust 244. The drier, pulverized solids feedstock (two-phase vapor and particulate) is then fed to gasifier 202 via a conduit 246.

Figure 3:
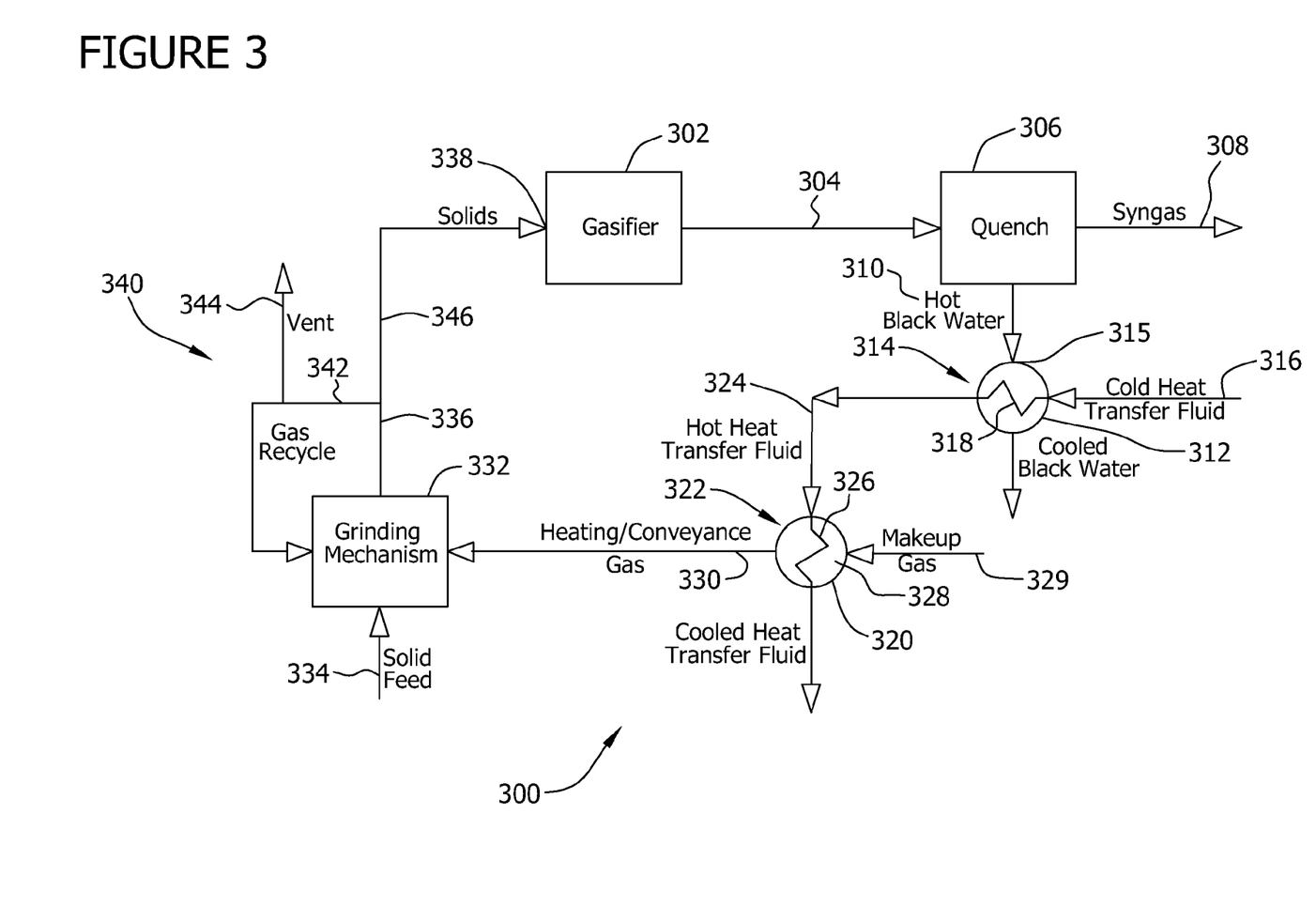
FIG. 3 is a process flow diagram of an alternative system that may be used in heating and drying the solid feedstock being channeled to the gasifier.

FIG. 3 is a process flow diagram of an alternative system 300 used for heating and drying solid feedstock channeled to a gasifier 302. In the exemplary embodiment, hot syngas produced by gasifier 302 (nominally at about 2400° F. to about 2600° F.) is channeled via a conduit 304 through a quench water sump 306, such as, for example, a gas-to-liquid heat exchanger that cools the syngas. The cooled syngas is then channeled via an output conduit 308 to gas turbine engine 10 (shown in FIG. 1) for use as fuel therein. The resulting heated liquid exits quench water sump 306 at approximately 300-500° F. and is channeled via a conduit 310 to a syngas cooler 312. More specifically, and in the exemplary embodiment, syngas cooler 312 includes a tube and shell configuration 314 and is coupled in flow communication with quench water sump 306 via conduit 310. Syngas cooler 312 receives the heated exhaust liquid from quench water sump 306 via conduit 310 at a shell-side input 315. A heat transfer fluid is channeled via a conduit 316 through a tube side 318 of syngas cooler 312. During heat transfer within syngas cooler 312, the temperature of the heat transfer fluid is increased to a temperature of between about 400° F. to about 1000° F., and the temperature of the hot exhaust liquid is cooled and subsequently discharged via conduit 319.

In the exemplary embodiment, a heat exchanger 320 having a tube and shell configuration 322 is coupled in flow communication with syngas cooler 312 via a conduit 324. Heat transfer fluid from syngas cooler 312 is channeled via conduit 324 through a tube side 326 of heat exchanger 320, and a quantity of makeup gas formed of combination of gases, i.e., nitrogen, oxygen and carbon dioxide, is channeled through a shell side 328 of heat exchanger 320 via an inlet conduit 329 to produce a dry, high temperature heating/conveyance gas. More specifically and in the exemplary embodiment, heat is transferred from the high temperature heat transfer fluid to the makeup gas, which is discharged from heat exchanger 320 via a conduit 330 at a temperature ranging from between about 300° F. to about 900° F. The makeup gas is channeled via conduit 330 to a grinding mechanism 332, wherein the makeup gas serves as a drying and conveyance medium for solid coal feedstock particulates produced within grinding mechanism 332, as described in more detail herein.

A stream of solid coal feed is channeled to grinding mechanism 332 via a conduit 334, wherein the solid coal is ground to a specified coarseness. In the exemplary embodiment, ground particulate feedstock is entrained in the makeup gas within grinding mechanism 332 and is discharged therefrom via an exhaust conduit 336, along with a quantity of water vapor removed from the solids particulate generated during the heating and drying process. Grinding mechanism 332 is coupled in flow communication with an inlet 338 of gasifier 302 via exhaust conduit 336. During operation, the makeup gas facilitates drying the pulverized fuel particulates that contain residual amounts of water, and provides the principal conveying medium to facilitate channeling the particulate solids through the grinding mechanism 332 to gasifier 302.

In the exemplary embodiment, to facilitate preventing an accumulation of water within system 300 and to control the amount and size of entrained feedstock particulates fed to gasifier 302, system 300 includes a vent assembly 340. A predetermined amount of the entrained solids/vapor stream within conduit 334 is recycled to grinding mechanism 332 via a recycle stream 342 (two phase) through a cyclone separator (not shown) that separates a majority of the entrained particulate from grinding mechanism 332 output flow within conduit 336. A portion of the vapor stream that contains water vapor generated during the heating and drying steps is vented to the atmosphere via an exhaust 344. The drier, pulverized solids feedstock (two-phase vapor and particulate) is then fed to gasifier 302 via a conduit 346.

Figure 4:
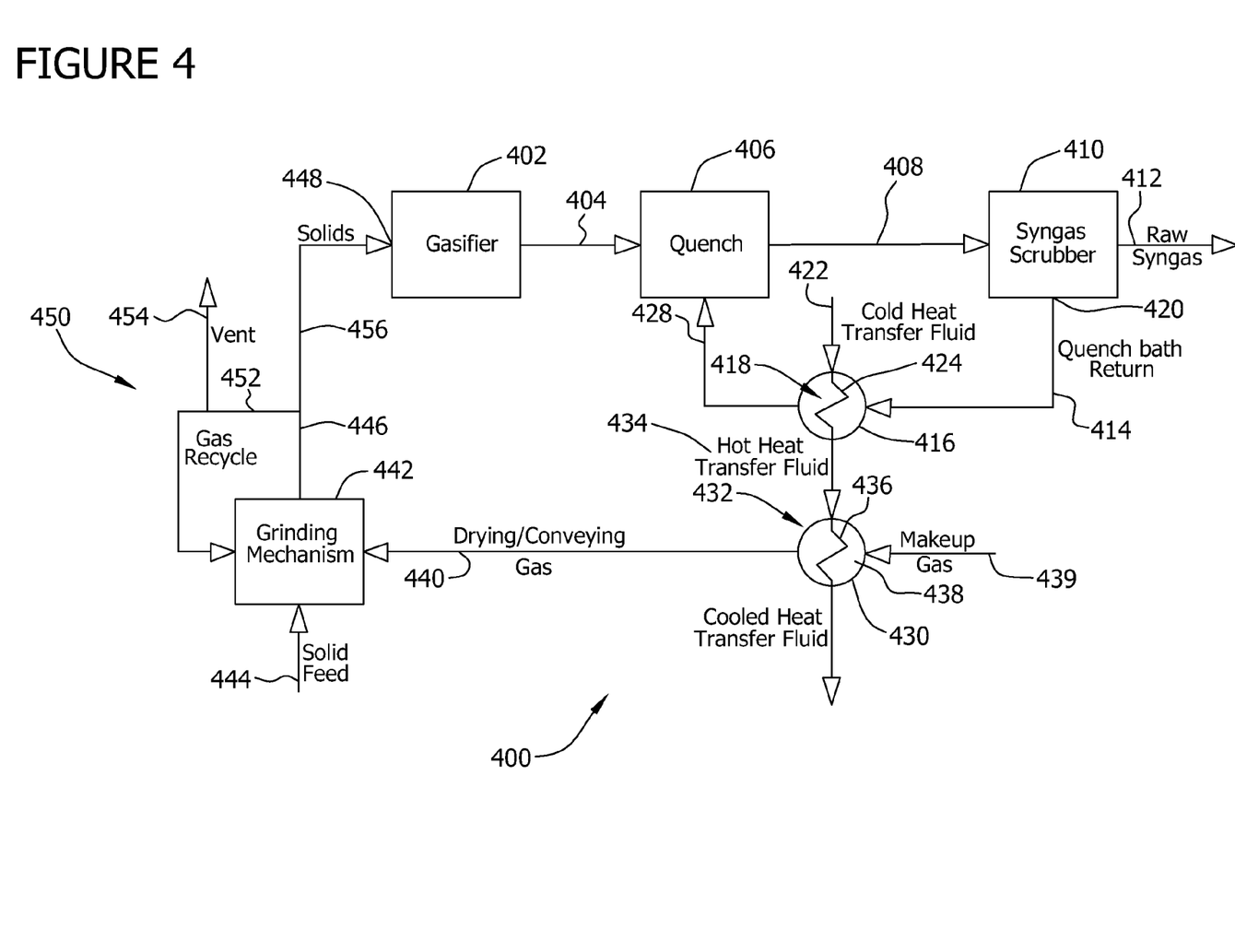
FIG. 4 is a process flow diagram of another alternative system that may be used in heating and drying the solid feedstock being channeled to the gasifier.

FIG. 4 is a process flow diagram of an alternative system 400 for use in heating and drying the solid feedstock channeled to a gasifier 402. In the exemplary embodiment, hot syngas produced by gasifier 402 (nominally at about 2500° F.) is channeled via a conduit 404 through a quench water sump 406, such as, for example, a gas-to-liquid heat exchanger that cools the syngas. The cooled syngas is then channeled via an output conduit 408 to a syngas scrubber 410 (for example, a packed column) that removes unwanted components from the initial gas stream, with the treated vapor stream exiting syngas scrubber 410 as a cooled and treated "raw syngas" at a temperature of about 500° F. The raw syngas is channeled via a conduit 412 to gas turbine engine 10 (shown in FIG. 1) for use as fuel therein. More specifically and in the exemplary embodiment, syngas scrubber 410 operates as a secondary quench water sump.

The heated liquid is discharged from syngas scrubber 410 at a temperature of approximately 300-500° F. and is channeled via a conduit 414 to a syngas cooler 416. More specifically and in the illustrated embodiment, syngas cooler 416 includes a tube and shell configuration 418 and is coupled in flow communication with syngas scrubber 410 via conduit 414. Conduit 414 extends from a bottom portion 420 of syngas scrubber 410 and channels the heated exhaust liquid to syngas cooler 416. Heat transfer fluid is channeled via a conduit 422 through a tube side 424 of syngas cooler 416. During heat transfer within syngas cooler 416, a temperature of the heat transfer fluid is increased to a temperature of between about 400° F. to about 1000° F., and the temperature of the hot exhaust liquid is cooled and returned via a conduit 428 to quench water sump 406.

In the exemplary embodiment, a heat exchanger 430 having a tube and shell configuration 432 is coupled in flow communication with syngas cooler 416 via a conduit 434. Heat transfer fluid from syngas cooler 416 is channeled via conduit 434 through a tube side 436 of heat exchanger 430, and a quantity of makeup gas formed of a combination of gases, i.e., nitrogen, oxygen and carbon dioxide, is channeled through a shell side 438 of heat exchanger 430 via an inlet conduit 439 to produce a dry, high temperature heating/conveyance gas. More specifically and in the exemplary embodiment, heat is transferred from the high temperature heat transfer fluid to the makeup gas, which exits heat exchanger 430 via a conduit 440 at a temperature of between about 300° F. to about 900° F. The makeup gas is channeled via conduit 440 to a grinding mechanism 442, wherein the gas serves as a drying and conveyance medium for solid coal feedstock particulates produced within grinding mechanism 442, as described in more detail herein.

A stream of solid coal feed is channeled to grinding mechanism 442 via a conduit 444, wherein the solid coal is ground to a specified coarseness. In the exemplary embodiment, ground particulate feedstock is entrained in the makeup gas within grinding mechanism 442 and is discharged therefrom via an exhaust conduit 446, along with a quantity of water vapor removed from the solids particulate or that was produced during the heating and drying process. Grinding mechanism 442 is coupled in flow communication with an inlet 448 of gasifier 402 via exhaust conduit 446. During operation, heating/conveyance gas facilitates drying the pulverized fuel particulates that contain residual amounts of water, and provides the principal conveying medium to facilitate channeling the particulate solids through the grinding mechanism 442 to gasifier 402.

In the exemplary embodiment, to facilitate preventing an accumulation of water in system 400 and to control the amount and size of entrained feedstock particulates fed to gasifier 402, system 400 includes a vent assembly 450. A predetermined amount of the entrained solids/vapor stream within conduit 446 is recycled to grinding mechanism 443 via a recycle stream 452 (two phase) through a cyclone separator (not shown) that separates a majority of the entrained particulate from grinding mechanism output flow within conduit 446. A portion of the vapor stream that contains water vapor generated during the heating and drying steps is vented to the atmosphere via an exhaust 454. The drier, pulverized solids feedstock (two-phase vapor and particulate) is then fed to gasifier 402 via a conduit 456.

Figure 5:
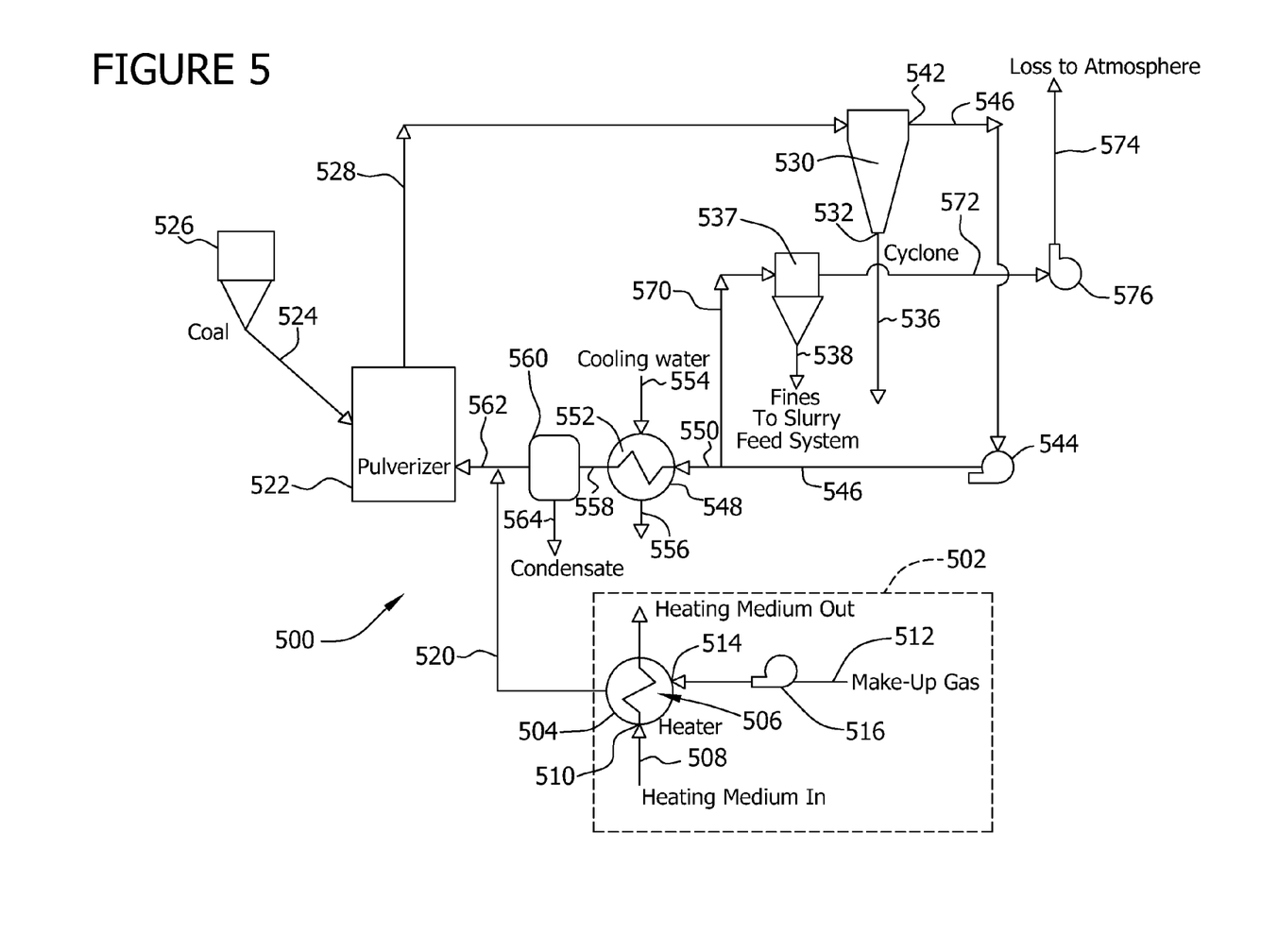
FIG. 5 is a schematic illustration of an exemplary dry feed system that may be used to channel solid feedstock to the gasifier.

FIG. 5 is a schematic illustration of an exemplary dry feed system 500 that may be used to channel solid feedstock to a gasifier (not shown in FIG. 5). In the exemplary embodiment, a syngas cooling subsystem 502 used with system 500 includes a heat exchanger 504 having a tube and shell configuration 506 that receives hot syngas via a conduit 508 at a shell side inlet 510 and receives makeup gas via a conduit 512 at a tube side inlet 514. Heat is transferred to the makeup gas within heat exchanger 504 as described herein. In the exemplary embodiment, a pressure of the makeup gas is increased using a compressor 516.

In the exemplary embodiment, heated makeup gas is channeled via a conduit 520 from heat exchanger 504 to facilitate drying and conveyance of the pulverized coal particulates generated through the grinding operation in a grinding mechanism 522, as described herein. An initial coal feed 524 from a coal bin 526 contains unwanted amounts of moisture that must be removed before coal feed 524 is fed to the gasifier. A resulting two-phase stream is channeled from grinding mechanism 522 via a conduit 528 and includes dry coal particulates and a moist gas stream conveying the particulates into a cyclone separator 530 that separates the solids from the moist recycle vapor using a bottom discharge cone 532. In the exemplary embodiment, the solids are channeled to the gasifier (not shown in FIG. 5) via conduit 536. The fine particles entrained in the two-phase flow within conduit 528 are channeled through a bag house 537 via a conduit that contains dust filters (not shown) that facilitates removal of any residual fines. The fines are then fed, as part of the solids feedstock, to the gasifier via a conduit 538.

A recycle conduit 540 extends from a top portion 542 of cyclone separator 530 and contains water vapor that must be removed before being recycled. A blower 544 facilitates channeling the combined water vapor and solids stream within conduit 546 through a condenser/heat exchanger 548 via an input 550 that includes cooling water on a shell side 552 channeled therethrough via an inlet 554 and an outlet 556. The resulting cooled condensate stream is channeled via conduit 558 through a condensate pot 560 that produces a substantially dry vapor stream 562 that forms a part of the heated dry stream channeled into the grinding mechanism 522. The condensed water is thereafter removed as condensate via a condensate line 564.

In the exemplary embodiment, a portion of steam is channeled via a return conduit 570 through a series of dust filters (not shown) within bag house 537 that facilitate removing additional coal feedstock fines. A vapor stream within an exhaust conduit 572 that contains moisture is vented to the atmosphere via a vent line 574 using a blower 576. The combination of heat exchanger 504 and grinding mechanism 522 results in significantly better flow characteristics for the coal feedstock to the gasifier, as well as improved heat characteristics of the resulting gasification due to the inherent removal of water vapor during the process.

Figure 6:
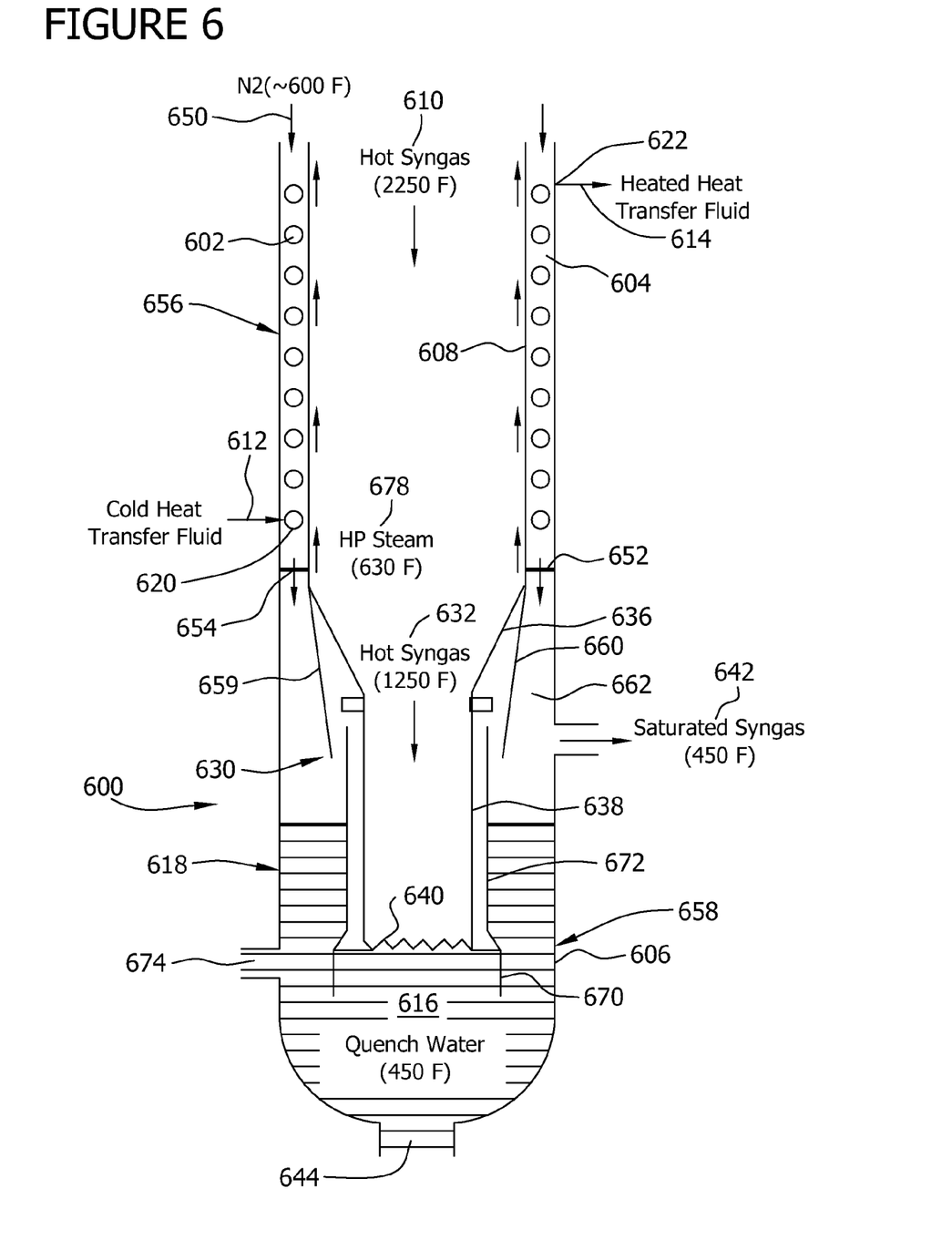
FIG. 6 is a schematic illustration of an exemplary syngas cooler (heat exchanger) that may be used with the gasification system shown in FIG. 1.
Figure 7:
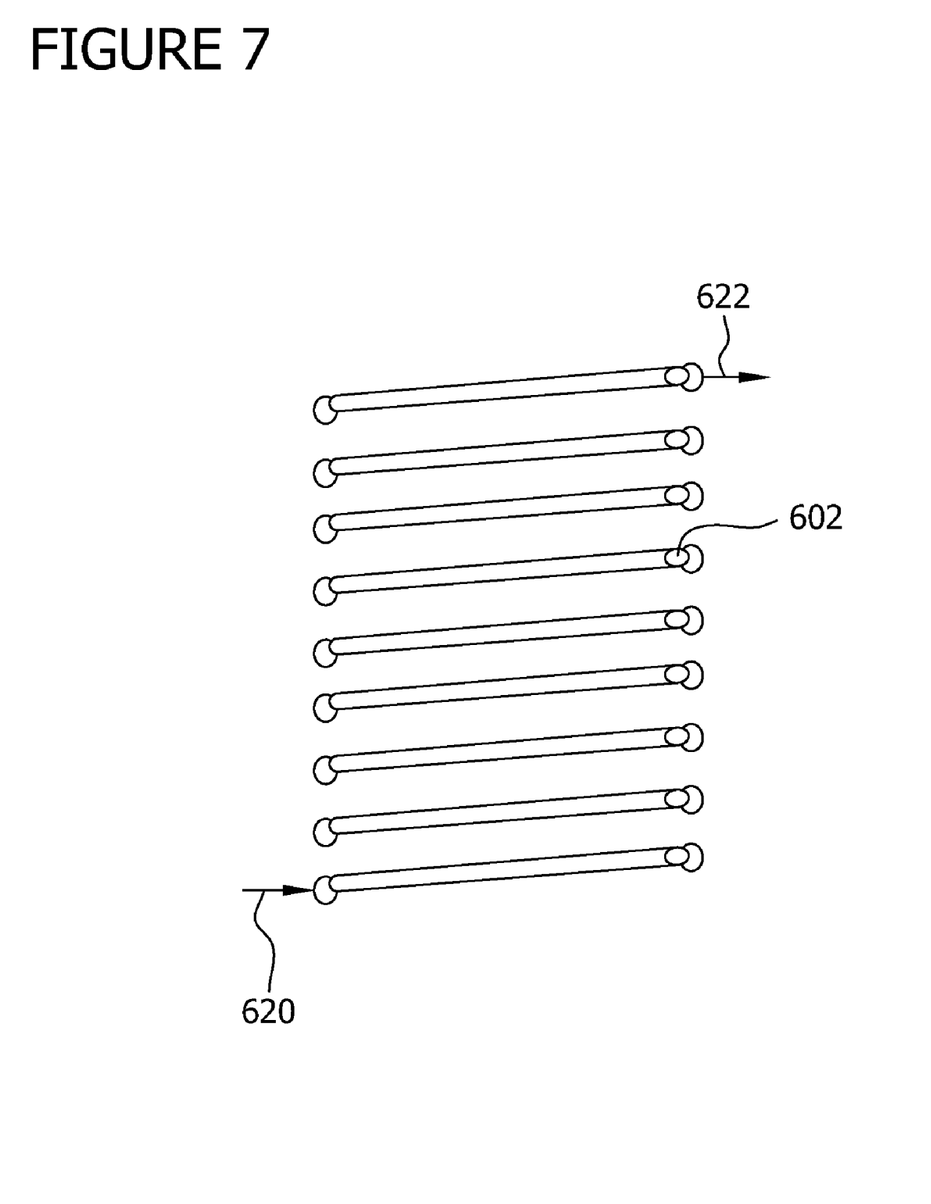
FIG. 7 is a front elevational view of an exemplary, horizontally-oriented coil that may be used with the syngas cooler shown in FIG. 6.

FIG. 6 shows an exemplary syngas cooler (heat exchanger) 600 that may be used in system 200 (shown in FIG. 2), and FIG. 7 is a front elevational view of an exemplary, horizontally disposed coil 602 that may be used with syngas cooler 600. In the exemplary embodiment, syngas cooler 600 includes a continuous, horizontally oriented heating coil 602 that extends through an annular space ("tube cage") 604 defined between an outer cylindrical shell wall 606 and a shell inner wall 608. Coil 602 is continuous in form and includes an inlet 620 and an outlet 622. Heating coil 602 is the main heating element for use in transferring additional heat from hot syngas 610 to cold heat transfer fluid 612 to produce hot heat transfer fluid 614, as described herein.

During operation, hot syngas 610 from gasifier 202 (shown in FIG. 2) enters syngas cooler 600 at a temperature of about 2,500-2,600° F. and is channeled across shell inner wall 608 into a quench chamber 616 that contains high temperature quench water (e.g., 450° F.) at a bottom region 618 of syngas cooler 600. In the exemplary embodiment, hot syngas 610 undergoes two different heat exchange operations. Initially, the syngas transfers heat to shell inner wall 608. Heat is then transferred to the coil 602. In the exemplary embodiment, cold heat transfer fluid enters via inlet 620, flows through coil 602 and exits coil 602 through outlet 622 at a significantly higher temperature, as described herein.

In a second heat exchange operation, syngas cooler 600 includes a quench subsystem 630 that facilitates cooling syngas 632 using quench water within quench chamber 616. Heated syngas 632 is channeled downward via a conical quench wall 636 to an inner cooler shell 638 prior it being discharged from an opening 640 formed in a bottom of inner cooler shell 638. The resulting saturated syngas 642, now at a much cooler temperature ranging from about 300° F. to about 500° F., is continuously removed from syngas cooler 600 via outlet 644.

In the exemplary embodiment, a flow of pre-heated nitrogen 650 at a temperature of about 450-650° F. is combined with the cold heat transfer fluid entering inlet 620 to increase the initial temperature of the heat transfer fluid. In the exemplary embodiment, syngas cooler 600 includes a plurality of seal assemblies 652 and 654 that divide syngas cooler 600 into an upper region 656 and a lower region 658 such that coil 602 is isolated from quench subsystem 630 and saturated syngas 642. In the exemplary embodiment, syngas cooler 600 includes splash plates 659 and 660 that contain and control the quench water below the saturated syngas 642 and below an annular region 662.

In the exemplary embodiment, a lower end 670 of dip tube 672 remains below quench chamber 634 during normal operation, as quench water enters quench subsystem 630 via inlet 674 and exits quench subsystem via outlet 676. During operation, syngas cooler 600 produces a high pressure steam 678 at about 650° F., which facilitates reducing the initial hot syngas to a nominal temperature of about 1500-850° F., while substantially simultaneously transferring heat energy to the heat transfer fluid stream using coil 602, as described herein.

In an alternative embodiment, heating coil 602 may be vertically-oriented and extend circumferentially within annular space 604. In another alternative embodiment, heating coil 602 may be horizontally-oriented, as shown in FIG. 6, but may be positioned within bottom region 618 within quench chamber 616. Alternatively, heating coil 602 may be horizontally-oriented as shown in FIG. 6, but be positioned on opposite sides of conical quench wall 636. In yet another alternative embodiment, heating coil 602 may be horizontally-oriented as shown in FIG. 6, but extend circumferentially about inner cooler shell 638 within quench chamber 616.

Figure 8:
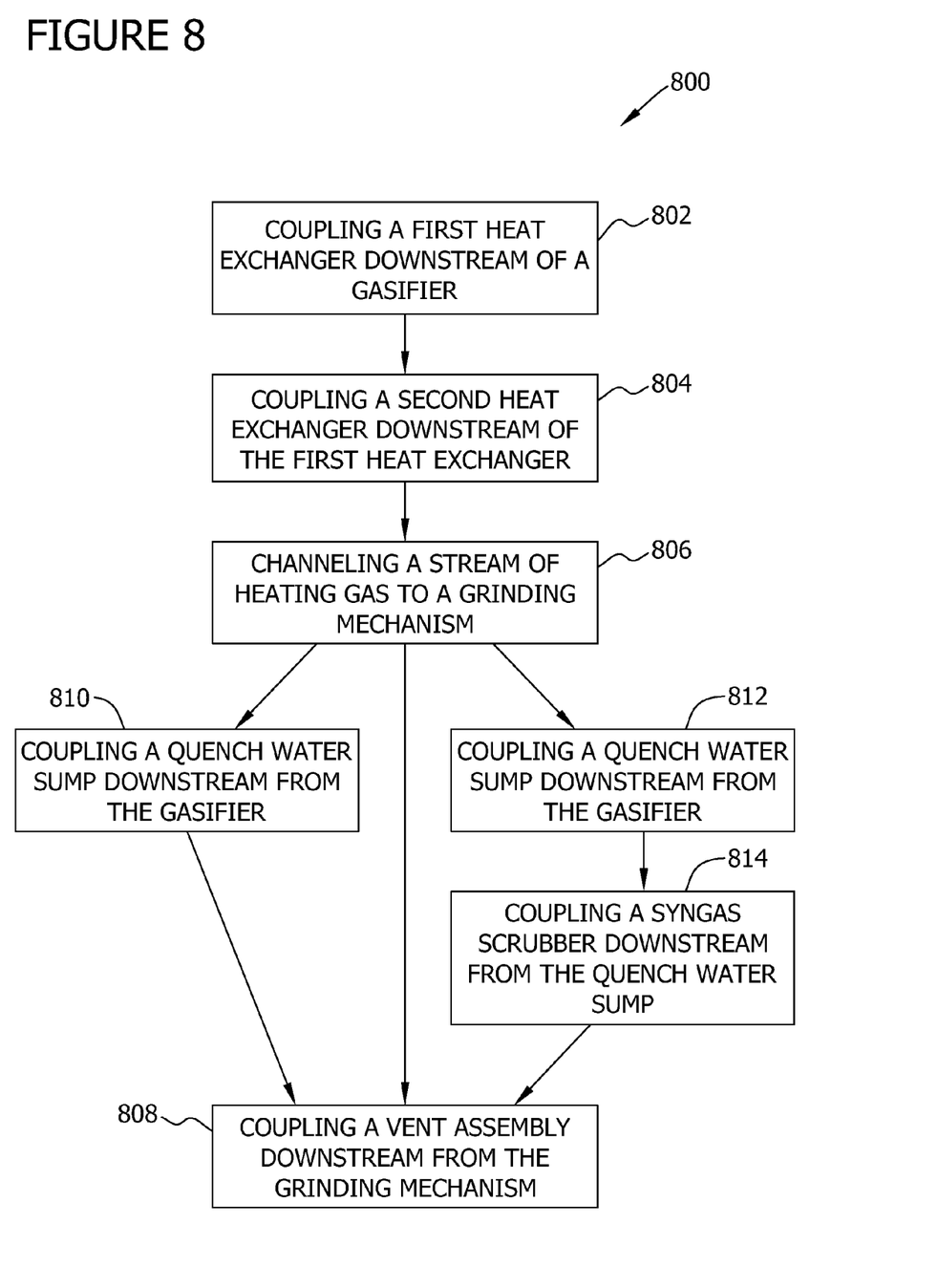
FIG. 8 is a flow diagram of an exemplary method for heating and drying solid feedstock in a gasification system.

FIG. 8 is a flow diagram of an exemplary method 800 for heating and drying solid feedstock in a gasification system. In the exemplary embodiment, method 800 includes coupling 802 a first heat exchanger downstream of a gasifier, wherein the first heat exchanger is configured to transfer heat from an input stream of heating fluid to an output stream of heat transfer fluid. Moreover, a second heat exchanger is coupled 804 downstream from the first heat exchanger. The second heat exchanger is configured to receive the output stream of heat transfer fluid from the first heat exchanger and transfer heat from the output stream of heat transfer fluid to a stream of makeup gas, as is described in more detail herein. In the exemplary embodiment, the stream of makeup gas is channeled 806 to a grinding mechanism to facilitate removing moisture from a stream of solid coal feedstock within the grinding mechanism.

In the exemplary embodiment, a vent assembly is coupled 808 downstream from the grinding mechanism. The vent assembly is configured to recycle a quantity of the reduced moisture solids to the grinding mechanism to facilitate preventing an accumulation of excess water in the gasification system.

In the exemplary embodiment, a quench water sump is coupled 810 downstream from the gasifier. Alternatively, a quench water sump is not included with system 200. The quench water sump is configured to receive a heated syngas stream from the gasifier and transfer heat to the first heat exchanger input stream, wherein the first heat exchanger input stream is a quantity of heated black water.

In another alternative embodiment, a quench water sump is coupled 812 downstream from the gasifier, wherein the quench water sump is receives a heated syngas stream from the gasifier and outputs a cooled syngas stream. Alternatively, a quench water sump is not included with system 200. In the alternative embodiment, a syngas scrubber is coupled 814 downstream from the quench water sump in flow communication with the first heat exchanger, wherein the syngas scrubber receives the cooled syngas stream and transfers heat to the first heat exchanger input stream.

Exemplary embodiments of systems for use in drying solid feedstock in a gasification system are described in detail above. The above-described systems and methods take advantage of an available heat source to dry ground solids that might otherwise not be processed effectively, and thus offers a thermally efficient and lower cost method for generating power. Drying the feedstock to remove surface moisture imparts free flowing properties that improve the overall thermal efficiency of the power generation plant. The amount of heat required to release unwanted moisture in the feedstock in accordance with embodiments disclosed herein depends on the process steps involved as well as the specific feed composition, but generally falls in the range of about 800-1900 btu/lbm of moisture evaporated. The temperature of the required heat source also typically ranges from about 300° F. to about 900° F. depending on the specific heat duty, the residence time in the drying step and the amount of recycled gas being used.

The invention exemplified by the embodiments described herein facilitates improving the efficiency of direct-fired coal systems in various ways. The makeup gas is directly heated using a "hot oil" or other known heat transfer fluid as opposed to alternative prior art configurations which require, for example, processes that convert heat into steam prior to transferring the heat from the steam to the makeup gas. By integrating the heating within the syngas cooler, the cost of a separate heat exchanger can be avoided. Moreover, the system and methods described herein result in significantly improved use of heat available in the raw syngas produced during an initial gasification of a solid feedstock.

Although the apparatus and methods described herein are described in the context of systems for drying solid feedstock in an IGCC power generation systems, it is understood that the apparatus and methods are not limited to such applications but may be applied to any gasification system. Likewise, the system components illustrated are not limited to the specific embodiments described herein, but rather, system components can be utilized independently and separately from other components described herein.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for heating and drying a quantity of coal feedstock, said system comprising:
    a quench water sump comprising a first heat transfer fluid, said quench water sump configured to receive a stream of heated fluid from a gasifier and to transfer heat from the stream of heated fluid to the first heat transfer fluid;
    a first heat exchanger coupled in flow communication with said quench water sump for transferring heat from the heated first heat transfer fluid to a second stream of heat transfer fluid; and
    a second heat exchanger positioned downstream from said first heat exchanger for receiving the heated second stream of heat transfer fluid from said first heat exchanger, said second heat exchanger transferring heat from the heated second stream of heat transfer fluid to a stream of makeup gas;
    wherein the makeup gas facilitates removing a quantity of moisture from the solid coal feedstock.

2. A system in accordance with claim 1 further comprising a grinding mechanism downstream from said second heat exchanger, said grinding mechanism configured to:
    channel a reduced moisture solids to the gasifier.

3. A system in accordance with claim 2, further comprising a vent assembly downstream from said grinding mechanism, said vent assembly configured to recycle a quantity of the reduced moisture solids to said grinding mechanism to facilitate preventing water accumulation in said system.

4. A system in accordance with claim 1, wherein the heated fluid comprises a heated syngas stream produced by the gasifier.

5. A system in accordance with claim 1, further comprising a syngas scrubber coupled in flow communication downstream from said first heat exchanger, said syngas scrubber configured to transfer heat to the first heat transfer fluid.

6. A system in accordance with claim 1, wherein said heat transfer fluid comprises one of a hot oil or water.

7. A gasification system comprising:
    a gasifier configured to output a stream of heated fluid; and
    a solid coal feedstock moisture removal system comprising:
        a quench water sump comprising a first heat transfer fluid, said quench water sump configured to receive the stream of heated fluid from said gasifier and to transfer heat from the stream of heated fluid to the first heat transfer fluid;
        a first heat exchanger coupled in flow communication with said quench water sump for transferring heat from the heated first heat transfer fluid to a second stream of heat transfer fluid; and
        a second heat exchanger positioned downstream from said first heat exchanger for receiving the heated second stream of heat transfer fluid from said first heat exchanger, said second heat exchanger transferring heat from the heated second stream of heat transfer fluid to a stream of makeup gas;
    wherein the makeup gas facilitates removing a quantity of moisture from a solid coal feedstock.

8. A system in accordance with claim 7 further comprising a grinding mechanism downstream from said second heat exchanger for receiving the stream of makeup gas prior to channeling a reduced moisture solids to the gasifier.

9. A system in accordance with claim 8, further comprising a vent assembly downstream from said grinding mechanism, said vent assembly configured to recycle a quantity of the reduced moisture solids to said grinding mechanism to facilitate preventing water accumulation in said system.

10. A system in accordance with claim 7, wherein the heated fluid comprises a heated syngas stream produced by the gasifier.

11. A system in accordance with claim 7, further comprising a syngas scrubber coupled in flow communication downstream from said first heat exchanger, said syngas scrubber configured to transfer heat to the first heat transfer fluid.

12. A system in accordance with claim 7, wherein said heat transfer fluid comprises one of a hot oil or water.

* * * * *